(12) United States Patent
Dong et al.

(10) Patent No.: US 9,550,162 B2
(45) Date of Patent: Jan. 24, 2017

(54) PRINTING LIQUID SOLUTION ARRAYS FOR INORGANIC COMBINATORIAL LIBRARIES

(75) Inventors: Yi Dong, Tracy, CA (US); Shifan Cheng, Dublin, CA (US); Dejie Tao, Fremont, CA (US); Yi-Qun Li, Danville, CA (US)

(73) Assignee: Intematix Corporation, Fremont, CA (US)

( * ) Notice: Subject to any disclaimer, the term of this patent is extended or adjusted under 35 U.S.C. 154(b) by 340 days.

(21) Appl. No.: 11/231,309

(22) Filed: Sep. 19, 2005

(65) Prior Publication Data

US 2007/0065947 A1   Mar. 22, 2007

(51) Int. Cl.
*B01J 19/00* (2006.01)

(52) U.S. Cl.
CPC ....... *B01J 19/0046* (2013.01); *B01J 2219/005* (2013.01); *B01J 2219/0061* (2013.01); *B01J 2219/0075* (2013.01); *B01J 2219/00315* (2013.01); *B01J 2219/00364* (2013.01); *B01J 2219/00369* (2013.01); *B01J 2219/00387* (2013.01); *B01J 2219/00477* (2013.01); *B01J 2219/00484* (2013.01); *B01J 2219/00495* (2013.01); *B01J 2219/00527* (2013.01); *B01J 2219/00572* (2013.01); *B01J 2219/00585* (2013.01); *B01J 2219/00596* (2013.01); *B01J 2219/00605* (2013.01); *B01J 2219/00612* (2013.01); *B01J 2219/00619* (2013.01); *B01J 2219/00621* (2013.01); *B01J 2219/00628* (2013.01); *B01J 2219/00659* (2013.01); *B01J 2219/00704* (2013.01); *B01J 2219/00736* (2013.01); *B01J 2219/00754* (2013.01)

(58) Field of Classification Search
None
See application file for complete search history.

(56) References Cited

U.S. PATENT DOCUMENTS

| | | |
|---|---|---|
| 5,424,186 A | 6/1995 | Fodor et al. |
| 5,463,564 A | 10/1995 | Agrafiotis et al. |
| 5,795,714 A * | 8/1998 | Cantor et al. ............... 435/6 |
| 5,985,356 A | 11/1999 | Schultz et al. |
| 6,101,946 A * | 8/2000 | Martinsky ............... 101/494 |
| 6,548,168 B1 * | 4/2003 | Mulvaney et al. ........ 428/402 |
| 2003/0148360 A1 | 8/2003 | Guire et al. |

FOREIGN PATENT DOCUMENTS

| | | | |
|---|---|---|---|
| JP | 2002-055105 A | 2/2002 | |
| JP | 2003-339389 A | 12/2003 | |
| JP | 2005-500530 A | 1/2005 | |
| JP | 2008-507199 A | 3/2008 | |
| JP | 2010-512840 A | 4/2010 | |
| JP | 2011-503611 A | 1/2011 | |
| WO | WO 00/17413 | * 3/2000 | ........... C23C 14/04 |

OTHER PUBLICATIONS

Drewry et al (1999 Medical Research Reviews 19:97-148).*
Glavee et al (1992 Langmuir 8:771-773).*
Gonzllez-Tello (1994 J. Chem. Eng. Data 39:611-4).*
An et al. ((2004) "Combinatorial synthesis and characterization of alkali metal doped oxides for diesel soot combustion." *Catalysis Today*, 98: 423-429.
Chen et al. (2004) "Combinatorial Synthesis of insoluble Oxide Library from Ultrafine/Nano Particle Suspension Using a Drop-on-Demand Inkjet Delivery System." *J. Comb. Chem.*, 6: 699-702.
Kirsten and Maier (2004) "Strategies for the discovery of new catalysts with combinatorial chemistry." *Applied Surface Science*, 223: 87-101.
Reuchenbach et al. (2003) "Combinatorial synthesis and characterization of mixed metal oxides for soot combustion." *Applied Catalysis B Environmental*, 44: 347-354.
Saalfrank and Maier (2004) "Doping, selection and composition spreads, a combinatorial strategy for the discovery of new mixed oxide catalysts for low-temperature CO oxidation." *C. R. Chime*, 7: 483-494.
Yanase et al. (2002) "Combinatorial study on nano-particle mixture prepared by robot system." *Applied Surface Science*, 189: 292-299.

\* cited by examiner

*Primary Examiner* — Christopher M Gross
(74) *Attorney, Agent, or Firm* — Quine Intellectual Property Law Group P.C.; Gary Baker (57) ABSTRACT

This invention provides methods and systems to prepare replicate arrays from master arrays of liquid solutions. Replicate arrays of liquid solutions can be reacted to form product solid inorganic material arrays for analysis and selection of optimum processes and products with desirable properties.

29 Claims, 5 Drawing Sheets

PRINTING LIQUID SOLUTION ARRAYS FOR INORGANIC COMBINATORIAL LIBRARIES

FIELD OF THE INVENTION

The present invention is in the field of methods and systems for preparation of replicate combinatorial libraries of liquid solutions. A master array of liquid solution can be replicated on a substrate. The array of liquid solutions can be reacted, e.g., by chemical reactions and/or physical conditions, to provide solid product inorganic compositions. Resultant combinatorial arrays of product compositions can be analyzed for desirable properties, such as electrical, dielectric, magnetic, mechanical, chemical, optical characteristics, phosphorescence, crystal nucleation, superconductivity, and the like.

BACKGROUND OF THE INVENTION

Combinatorial arrays of materials are useful, e.g., in screening compositions for unique or improved characteristics. In the biosciences, combinatorial arrays can be useful in discovery of molecules with desirable binding or catalytic activities. In materials sciences, combinatorial arrays have been constructed to discover materials with useful physical, catalytic, chemical, mechanical, or optical characteristics. Combinatorial technologies can provide efficient ways to create and screen materials useful in medicine, electronics, optics, packaging, machinery, and more.

Arrays can be found in many fields, for example: printing, mathematics, video display, art, life sciences, electronics, and the like. These arrays typically include many elements with common characteristics grouped in homogenous zones of the array to form interesting or useful patterns (such as, images, textures, or environments). Combinatorial arrays typically include substrates with randomly or systematically different constituents combined at different locations. Large scale combinatorial libraries can include extensive arrays of different materials combinations at different locations providing screenable populations containing variety of useful properties.

Combinatorial arrays in chemistry have been found useful in discovery of chemicals with unique properties or in finding improved versions of previously known molecules. In U.S. Pat. No. 5,463,564, System and Method of Automatically Generating Chemical Compounds with Desired Properties, to Agrafiotis, et al., a computer based, iterative process generates chemical entities with defined chemical properties. During each iteration of the process, a directed diversity chemical library is robotically generated in accordance with robotic synthesis instructions; the compounds in the directed diversity chemical library are analyzed to identify compounds with the desired properties; structure-property data are used to select compounds to be synthesized in the next iteration; and new robotic synthesis instructions are automatically generated to control the synthesis of the directed diversity chemical library for the next iteration. The combinatorial organic chemistries of Agrafiotis, et al., are carried out, e.g., by combinatorial robots that mix and split bead substrates to different organic reagents or robots that sequentially transfer reagents to solid support array locations.

Combinatorial arrays in biology can include random or systematic arrays of biomolecules on substrates, such as beads or grids on solid supports. In U.S. Pat. No. 5,424,186, Very Large Scale Immobilized Polymer Synthesis, to Fodor, et al., for example, sequential combinations of nucleotides are extended as oligonucleotides growing on a substrate. An array of oligonucleotides having different sequences is prepared by using a system of photoactivation chemistries with reactions directed by illumination of substrate locations through a mask. As with the Agrafiotis technology, reproduction of an array requires reconstruction from scratch by repeating the entire synthesis sequence.

In inorganic materials science, arrays have been prepared using continuous or discrete application of different inorganic materials for reaction on a substrate. For example, in Combinatorial Synthesis of Novel Materials, U.S. Pat. No. 5,985,356, to Shultz, et al., multiple different inorganic materials are applied to multiple regions of an array before reaction of the mixtures to form a combinatorial array of inorganic materials. Shultz, et al., discusses the use of robotics to discretely apply the different materials for combination on the substrate, using masks to direct application of materials to specific regions of a substrate, use of gradients to apply materials to substrates in changing proportions, and spacing array locations to reduce cross contamination. Still, problems remain in providing well defined, homogenous, and repeatable arrays having the same combinations in the same proportions on a substrate. Again, replication of an array in Shultz, et al., requires complete reconstruction of a duplicate array from scratch. This invention can be applied to liquid solution processes for synthesis of a combinatorial array of inorganic materials. However, liquid combinatorial libraries can be difficult to prepare. The general methods of preparation of liquid combinatorial libraries known in the art have problems with stability, homogeneity, and uniformity, especially if the members of the array comprise solvated metal ions. Generally, it is only possible to solvate ions having high valences (e.g., rare earth metal ions such as $Ti^{4+}$, $Ta^{5+}$, and $Nb^{5+}$). Although certain organic solvents may occasionally work in this regard, more often than not the ions precipitate to form non-homogeneous solutions, or an otherwise unstable solution. Even if one is able to produce a solution containing these metal ions, including high valence rare earth metal ions, there is still a potential for precipitation of the ionic species or the instability of the solution if new solvents or reagents are added, or if the solvents from different libraries are combined or mixed. This is especially true for aqueous solutions.

What is needed in the art, therefore, is a way of stabilizing liquid arrays of materials, including solutions of high valence ions, such that the array may be stored for further processing. It is contemplated that such an intermediate array may be commercialized in that stabilized condition, such that another investigator or commercial entity may further process the array according to its own proprietary interests.

The present inventors have developed systems and methods for controlling and maintaining a stable distribution of metal ions in solution at the molecular level, thus ensuring a homogeneous mixture, and these techniques are particularly useful when processing or transferring a liquid master array either to a substrate or to an intermediate liquid array. According to these methods, a metal precursor and a soluble polymer are reacted to form a solution that does not suffer from the conventional problems of gelling or precipitation. The polymer actively binds the metal ion(s) and serves to encapsulate the metal, prevent chemical reactions between constituent ions of the mixture, and maintain the ions in a uniform distribution within the solution. In other words, the polymer functions to ensure a homogeneous metal ion distribution in the solution, and to isolate ions from one another to prevent unwanted reactivity between the metal ion constituents. The stabilized array at this stage could be the master array or a replicate array, and it may comprise an array that exists prior to the final deposition onto a substrate to create the product array. Such stabilized liquid solutions (existing as individual members of an array) may be stable, according to the present embodiments, for up to months at a time.

In view of the above, a need exists for systems and methods to reliably and reproducibly prepare combinatorial arrays of inorganic materials through liquid solutions. It would be desirable to have systems to readily prepare replicate arrays of a homogeneous, well mixed, and stable liquid solution on a practical substrate. The present invention provides these and other features that will be apparent upon review of the following.

SUMMARY OF THE INVENTION

The present invention provides methods and systems to prepare replicate combinatorial libraries of inorganic materials combinations. Such combinations can react to form products with useful detectable characteristics.

Methods of preparing arrays of inorganic material combinations include, e.g., preparing a master array of well mixed and homogenous liquid solutions with the composition designed for final inorganic material combinations and transferring a replicate array of the master array onto a substrate to provide a replicate array of liquid solution combinations. The master array can be stored for use at another time to prepare an identical second, third, or fourth replicate array. The replicate arrays can be treated, e.g., by exposure to certain chemical reactive processes under certain physical conditions to form an array of final single phase or multiphase materials. Reaction product compositions can be analyzed to define useful process conditions and/or to identify compositions with desirable characteristics. An advantage of this inventive method is the ability to readily and accurately produce a set of identical arrays of various composition materials on the same kind of substrates for individual testing under different chemical or physical conditions.

Master arrays can be prepared manually or by automated techniques. Stock solutions of inorganic material solutions are typically prepared manually to have known concentrations (molarities) of inorganic materials. Stabilizing polymers can be included, e.g., to chemically stabilize the materials or to help maintain homogenous distribution of the materials in the solution. Combinations of two or more inorganic materials can be prepared, e.g., by mixing two or more stock solutions at locations in a master array. Master arrays can have, e.g., 2 or more locations, 8 or more locations, 32 or more locations, 96 or more locations, 384 locations, or more. Each master array location can receive materials that provide inorganic material combinations significantly different (e.g., in materials and/or materials proportions) from combinations at other locations on the master array. A typical master array can include one or more multiwell dishes containing different combinations of inorganic materials in two or more wells.

Inorganic materials can be, e.g., any materials that do not include carbon-hydrogen bonds. The inorganic materials can be produced from metal compounds in solution in an aqueous and/or organic solvent liquid. In many cases, the inorganic materials can be metal compounds associated with stabilizing polymers in solution. Typical inorganic materials are metals, metal ions, metal salts and/or metal oxides. The materials can be a compounds of, e.g., Aluminum, Antimony, Barium, Bismuth, Boron, Cadmium, Calcium, Carbon, Cerium, Chromium, Cobalt, Copper, Dysprosium, Erbium, Europium, Gadolinium, Germanium, Gold, Hafnium, Holmium, Indium, Iridium, Iron, Lanthanum, Lead, Lithium, Lutetium, Magnesium, Manganese, Molybdenum, Neodymium, Nickel, Niobium, Palladium, Platinum, Polonium, Praseodymium, Rhenium, Rhodium, Ruthenium, Samarium, Scandium, Selenium, Silicon, Silver, Strontium, Tantalum, Tellurium, Terbium, Thallium, Thulium, Tin, Titanium, Tungsten, Vanadium, Ytterbium, Yttrium, Zinc, Zirconium, oxidized forms thereof, and/or ionized forms thereof.

The substrate can be any substrate suitable for application of replicate arrays and compatible with reactions to produce product compositions. Substrates are typically made from a material compatible with reaction conditions and having a surface suitable for receiving transfers of combinations and analysis of compositions. Typical substrates are made from, e.g., ceramics, glass, graphite, silicon, alumina, a polymer, carbon composite, metals, and the like. Substrates can take any suitable form, such as, e.g., a flat disk, a segregated surface, or a population of beads.

Transferring combinations from a master array to a replicate array can be sequential or the array members can be transferred in parallel. The replicate array can be topographically arranged as an exact copy of a master array, or the replicate can include selected combination members in arrangements different from that of the master array. In one embodiment, transferring comprises sequential robotic transfer of master array liquid inorganic material combinations to the substrate. In an alternate embodiment, transferring comprises transfer of the liquid inorganic material combinations onto the substrate in parallel, e.g., at once using a transfer block.

Reacting dried replicate array of liquid arrays to form product solid inorganic material arrays can be accomplished by exposing the combinations to chemical and/or physical conditions that promote the desired reactions. Reactions can be promoted by exposure of the material combinations for a certain length of time to a temperature, a pH, a light frequency, a metal vapor (e.g., to promote epitaxial growth), a pressure, a solvent, a gas, and the like. Temperature is an important reaction parameter in many embodiments. For example, reacting can be by exposing the combinations on a substrate to a temperature of 450° C., or more, to form product compositions. Reacting can include adjustment of the reaction environment pressure, e.g., from a strong vacuum to a high pressure, from about 10 torr to about 5,000 psi, to about 100 torr to about 2,000 psi, from about 500 torr to about 1,000 psi or about 760 torr to about 100 psi.

Useful process parameters and compositions can be identified by analyses of the product compositions. Analysis can be by detecting a signal emanating from one or more of the product compositions on a substrate. The analysis of compositions can be based on spectroscopy, detecting an electric current, detecting a voltage, microscopy, fluoroscopy, magnetic detection, and/or the like, as appropriate.

In one embodiment for comparing reaction process parameters identical replicate arrays are transferred from a master array onto two substrate, the first replicate array is exposed to conditions of a first process, and the second replicate array is exposed to conditions of a second process. Signals are detected from the same locations in the first and second arrays. The signals detected from corresponding array locations on the first and second arrays are compared to determine differences in effects of the first and second process conditions on the inorganic material combinations. Process conditions resulting in the more desirable product can be selected for large scale production of product, or can provide a standard of comparison for further rounds of process parameter screening.

Systems for preparing replicate arrays of inorganic material combinations and for reaction and screening of product compositions are contemplated in the invention. For example, a system can include a master array of liquid solutions, a substrate with a surface to receive a replicate array of the liquid solutions, and devices to transfer the liquid solutions from the master array onto the substrate surface.

The inorganic material liquid solutions can be essentially as described above for methods of preparing replicate arrays. The liquid solutions can comprise a inorganic solution or a polymer stabilized solutions. The polymer can be, e.g., a polyanionic polymer, a polycationic polymer, mixed ionic polymers, a peptide, polyethyleneimine (PEI), heparin, carboxylated polyethyleneimine (PEIC), polyethylene oxide, polyelectrolytes, polyacrylate, perfluorosulphonate, perfluorocaboxylate, acrylamide, polyacrylic acid, polyacrylonitrile, a polynucleotide, a protein, polycarbonate, diethylaminoethyl-dextran, dextran sulfate, polyglutamic acid, polyphosphate, polyborate, nitrilotriacetate (NTA), ethylene diamine tetraacetate (EDTA) groups, poly histidine, DMPS, DMSA. DMSO, Bipyridyl, Ethyleneglycol bis2-aminoethyl tetraacetic acid (EGTA), Hydroxyethylethylenediamine triacetic acid (HEDTA), hydroxyethyl starch (HES), dextran, dextrin, inulin, polyvinyl pyrrolidone (PVP), polystyrene, and/or the like.

The transfer devices can be any appropriate devices, such as, e.g., a multipipettor, robotic transfer devices, a direct printing or indirect printing technique, a pump driven conduit, a sequential transfer device, parallel transfer device, etc. In one embodiment, the transfer device is a transfer block having an array of transfer probes spaced in register with locations of the master array. The probes can be, e.g., pins or capillary tubes.

The system can include, e.g., a heating device to dry material combinations, vaporize polymers from combinations, and/or to provide a preferred reaction temperature. The heating devices can be, e.g., a hot plate, a drier, an oven, a furnace, a heat lamp, a laser, a resistive heater, etc., to provide required heat at the substrate or array locations. In many embodiments, the heating device is an oven that provides reaction temperatures and/or pressures to convert material combinations into product compositions.

Systems of the invention can include one or more detectors to detect a signal from the substrate surface. Detectors can be, e.g., ohm meters, fluorometers, volt meters, ammeters, photometers, charge coupled devices, magnetometers, enzymes, microscopes, and the like. Detectors can be used to analyze or screen combinatorial arrays of product compositions for useful properties.

Embodiments of present invention are directed to a method of preparing replicate arrays of liquid solutions, which includes preparing a master array of liquid solutions, each liquid solution having a unique address in the master array; and transferring the replicate array of the master array onto a first substrate. The transfer may take place either serially (meaning that each of the members of the array are transferred sequentially) or in parallel (the members are transferred simultaneously). In the case of a parallel transfer, the master array may be contacted with a transfer block, and then the transfer block contacted with the substrate.

This produces a first replicate array of the liquid solutions. The replicate array of liquid solutions array can be then transformed into a product array of solid inorganic materials. The transformation may take place either by drying, chemical reaction, or by heating the substrate to a temperature greater than about 20° C. The solid inorganic materials in the product array may be in either oxided for or ionic form.

According to embodiments of the present invention, the liquid solutions of the master array combines at least two metal elements, metal compounds, metal-containing compounds, or inorganic compounds, and various combinations thereof, at each address of the master array. The master array has at least eight liquid solutions in the array, and therefore eight addresses. In one embodiment of the present invention each liquid solution of the master array is contained within one well of a multiwell dish.

According to embodiments of the present invention, the substrate onto which the replicate array is printed may comprise a variety of materials, including a ceramic, a glass, silicon, quartz, graphite, a polymer, a plastic, a composite, a metal, and a metal compound. Additionally, the master array of liquid solutions may have at least one of the liquid solutions present in the array in a stabilized form. In some embodiments, the stabilized liquid solution may be stabilized with a polymer, but other methods of stabilizing the liquid solutions are contemplated. When a polymer is used to stabilize a liquid solution, it is possible for at least one of the components of the liquid solution to bind to the polymer.

Advantages of the present embodiments include being to prepare two replicate arrays, or two product arrays, and comparing the difference between the two with only slight variations in processing of the two arrays. Since each array can contain a large number of addresses, this allows for a very large number of experiments to be performed in parallel. For example, the present embodiments include methods of preparing replicate arrays of liquid solutions by first preparing a master array of liquid solutions, each liquid solution having a unique address in the master array; transferring at least a portion of each of the liquid solutions from the master array to a first substrate to form a first replicate array of liquid solutions; transferring at least a portion of each of the liquid solutions from the master array to a second substrate to form a second replicate array of liquid solutions; using a first process to transform the first replicate array of liquid solutions into a first product array of solid inorganic materials; using a second process to transform the second replicate array of liquid solutions into a second product array of solid inorganic materials; and then detecting a signal from at least one address of the first product array, and comparing that signal to a signal detected from the corresponding address of the second product array. The first and second process parameters may be temperature, pressure, time, radiation exposure, chemical reaction, solvent exposure, or gas exposure.

Embodiments of the present invention include systems for preparing replicate arrays of liquid solutions. Such a system may comprise a master array of liquid solutions, each liquid solution having a unique address in the master array; a substrate having a surface to receive a replicate array from the master array of the liquid solutions; and a transfer device for transferring at least one of the liquid solutions of master array to the surface of the substrate to prepare the replicate array. The transfer device may comprise a transfer block having an array of transfer probes spaced in register with the liquid solution addresses of the master array. The transfer probes may comprise pins or capillary tubes.

DEFINITIONS

Unless otherwise defined herein or below in the remainder of the specification, all technical and scientific terms used herein have meanings commonly understood by those of ordinary skill in the art to which the present invention belongs.

Before describing the present invention in detail, it is to be understood that this invention is not limited to particular devices or biological systems, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content clearly dictates otherwise. Thus, for example, reference to "a material" can include a combination of two or more materials; reference to "constituents" can include one or more of constituents, and the like.

Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

The term "combinatorial array", as used herein, refers to a collection of two or more different product compositions at different locations on a substrate, where the product compositions are produced from a combination of 2 or more different materials.

The term "product composition", as used herein, refers to the reaction product of two or more different inorganic materials. Different product compositions can be the reaction products of different inorganic material combinations or reaction products of the same inorganic materials combined in different proportions.

The term "reaction", as used herein, refers to any chemical or physical reaction that converts a combination of two or more different materials into a product composition. Physical reactions can include, e.g., co-crystallization, fusion, alloying, amalgamation, melting together, sintering, and the like. Chemical reactions can include those known in the art, such as, e.g., the formation of molecular bonds between two or more elements and/or molecules.

A "substrate", as used herein, refers to a material having a rigid or semi-rigid surface on which liquid solutions or suspensions of inorganic materials can be applied.

The term "inorganic material", as used herein, refers to elements or molecules not containing a hydrocarbon (C—H) bond. Typically, inorganic materials are minerals or metals. "Inorganic material combinations" refers to mixtures or solid solution of two or more different inorganic materials.

A "metal" as generally used herein, refers to a metal salt; a metal oxide; a metal ion; a metal that is a constituent of a molecule, a crystal or an alloy; or a metal in elemental form.

A "master array" refers to an array of two or more different liquid solutions from which one or more replicate arrays can be transferred.

A "replicate array" is a replicate of master array of liquid solutions transferred from the master array onto a substrate. A replicate array can have the liquid solutions arranged in the same spatial order as the master array, or in a different spatial order, such as, e.g., in a "mirror image" arrangement or in a higher density microarray.

The term "vaporize", as used herein, refers to removal of certain components in the form of a vapor or gas.

The term "fuse", as used herein, refers to combination of two or more different materials resulting from heating. For example, by melting a metal, formation of an alloy, or heating and cooling to form a crystal of two or more inorganic materials.

"Sinter", as used herein, refers to transformation of a mixture of two or more different materials into a solid mass by heating a temperature less than the melting point of at least one of the materials.

DETAILED DESCRIPTION

The present invention concerns methods and systems for preparing replicate arrays of liquid solutions and combinatorial arrays of inorganic materials product compositions. A master array of liquid solutions can be prepared, e.g., in a multi-well plate. The master array can be transferred to the surface of a substrate, serially and/or in parallel, to provide a replicate array of the master array. Material combinations can be reacted to form combinatorial product compositions. The compositions can be analyzed to characterize their properties.

Methods of Preparing Replicate Liquid Solution Combinatorial Arrays

Methods of preparing arrays of inorganic material product compositions can generally include the steps of preparing a master array of liquid solutions, transferring samples of master array combinations to locations on a substrate to provide a replicate array of materials combinations, and reacting the combinations to form combinatorial arrays of product inorganic compositions. The reactions can include chemical and/or physical reactions between the materials in the combinations. Signals emitting from materials or products at array locations can be detected for analysis.

Replicating Liquid Solution Arrays on Substrates

Solutions of inorganic materials or polymer stabilized inorganic materials can be transferred from a master array to a replicate array by any number of suitable techniques. Transfers of master array materials to replicate arrays can be serial and/or parallel, direct or indirect, manual or automated.

For example, a combinatorial array of mixed metal oxide (inorganic material combinations) solutions can be formed by manual combination of different metal salts to wells of a 96-well plate liquid master array. The array of the liquid solutions can by serially transferred to locations on a substrate, e.g., using a pin head (wettable probe) transfer devices at the end of a robotic arm to prepare a replicate array of materials combinations. Optionally, the robot arm can include, e.g., multiple pipettor tips to transfer more than one material combination at a time to the substrate. Heat can be applied to the substrate, drying and sintering together the liquid solutions at the replicate array locations to form a combinatorial array of product inorganic compositions.

Alternately, replicate arrays can be prepared using parallel transfer techniques. For example, stock solutions of inorganic material solutions can be robotically combined in a 384-well plate to provide a master array. A transfer block is provided having probes protruding from a flat support surface in a pattern in register with the spacing of wells in the 384 well plate. The transfer block is placed in an orientation with the probes aligned with the wells so that the probes can be dipped at once to contact solutions in multiple wells. The probes are wet with the solutions on contact. The transfer block is repositioned over a substrate surface so that the wet probes contact and transfer solution to the surface in parallel to produce a replicate array of the liquid solutions on the substrate. As above, the substrate can be heated to form an array of product inorganic compositions for analysis.

In another embodiment, solutions of a master array can be directly transferred to a substrate surface. For example, a substrate surface can be brought into a position directly above a master array of material combinations in a multiwell plate. The substrate can be pressed in a sealed contact with the top of the plate before, e.g., inversion together of the plate and substrate. The liquid material combinations from the master array will come into contact and wet the substrate surface at locations to provide a mirror image replicate of the master array on the substrate. The plate/substrate combination can be brought back upside right and the substrate removed for reaction and analysis. The process can be repeated with new substrates to prepare multiple replicates. Optionally, in a technique similar to offset printing, a mirror image array can be transferred to a transfer surface that can be brought into contact with a substrate to provide a replicate array having the same order of array members as the master array (i.e., not a mirror image array).

In yet another embodiment, a portion of the array of liquid solutions are transferred from the master array to a replicate array on a substrate, e.g., without necessarily repeating or reflecting the master array arrangement in the replicate array arrangement. For example, a computer with a database of master array combinations can direct a robotic transfer devices to transfer combinations of particular interest to a substrate, e.g., in an order not determined by the original order of the master array. The computer can retain a record of what master array combination was transferred to each replicate array location. The resultant replicate array can be reacted and analyzed. The composition and corresponding master array location of interesting products can be reliably determined based on the computer records of the process, as is appreciated in the art.

Inorganic Material Solutions

Inorganic materials of interest for application in arrays of the invention can be, e.g., elements, ions, or molecules without carbon-hydrogen bonds. For application to substrates, the inorganic materials form solutions in a liquid form. The liquid can be, e.g., aqueous, a polar solvent, organic solvents, and/or a hydrophobic liquid. The materials can be associated with one or more polymers, which stabilize the solution of materials.

Many useful inorganic materials of interest in the invention include metals in the elemental form or in the form of a metal compound. For example, the inorganic materials can comprise elemental forms, ionized forms, and/or compounds of: Aluminum, Antimony, Barium, Bismuth, Boron, Cadmium, Calcium, Carbon, Cerium, Chromium, Cobalt, Copper, Dysprosium, Erbium, Europium, Gadolinium, Germanium, Gold, Hafnium, Holmium, Indium, Iridium, Iron, Lanthanum, Lead, Lithium, Lutetium, Magnesium, Manganese, Molybdenum, Neodymium, Nickel, Niobium, Palladium, Platinum, Polonium, Praseodymium, Rhenium, Rhodium, Ruthenium, Samarium, Scandium, Selenium, Silicon, Silver, Strontium, Tantalum, Tellurium, Terbium, Thallium, Thulium, Tin, Titanium, Tungsten, Vanadium, Ytterbium, Yttrium, Zinc, Zirconium, oxidized forms thereof, ionized forms thereof, and/or the like. Ionized forms can include metal salts, such as, e.g., carbonates, nitrates, phosphates, chlorides, acetates, chelated forms, and/or the like.

Polymers useful in the present invention can stabilize the inorganic materials in solution. Stabilizing, as used with regard to polymers herein, refers to interactions with inorganic materials of interest so that they can be applied consistently using methods of the invention. In general, in at least one stage of the processing of the present combinatorial array(s), a polymeric solution is mixed with a metal ion solution to effect the stabilized array. The polymeric solution may be prepared by dissolving a polymer such as polyethylenimine $(C_2H_5N)_n$ in water. Other components such as ethylenediaminetetraaceticacid (EDTA, $C_{10}H_{16}N_2O_8$) may be added to this solution. Next, the corresponding salt of the metal ion under investigation in the combinatorial library is prepared by dissolving the salt in water. In one embodiment of the present invention, nitrates may be used. The metal ion solution is then mixed with the polymer solution such that the polymer/EDTA encapsulates the metal ion(s). In some instances, it may be necessary to add either an acid or a base to the polymer/EDTA metal salt solution to assist with the encapsulation.

Other polymers that may be used in conjunction with EDTA to encapsulate the metal ion and stabilize the liquid array include a polyanionic polymer, a polycationic polymer, mixed ionic polymers, a peptide, polyethyleneimine (PEI), heparin, carboxylated polyethyleneimine (PEIC), polyethylene oxide, polyelectrolytes, polyacrylate, perfluorosulphonate, perfluorocaboxylate, acrylamide, polyacrylic acid, polyacrylonitrile, a polynucleotide, a protein, polycarbonate, diethylaminoethyl-dextran, dextran sulfate, polyglutamic acid, polyphosphate, polyborate, nitrilotriacetate (NTA), ethylene diamine tetraacetate (EDTA) groups, poly histidine, DMPS, DMSA. DMSO, Bipyridyl, Ethyleneglycol bis2-aminoethyl tetraacetic acid (EGTA), Hydroxyethylethylenediamine triacetic acid (HEDTA), hydroxyethyl starch (HES), dextran, dextrin, inulin, polyvinyl pyrrolidone (PVP), polystyrene, and/or the like.

Virtually any metal in the periodic table may be used in the present embodiments. For example, the metal may comprise a group IA element, such as Li, Na, K, Rb, or Cs. These ions are monovalent. Alternatively, the metal may comprise a divalent ion from the group IIA alkaline earth metal column such as Ca, Sr, Ba, Mg, or other divalent metal ions such as Co, Mn, Zn, and Pb. Trivalent metal ions include Al, Ga, La, Ce, Pr, Nd, Po, Sm, Eu, Gd, Tb, Dy, Ho, Er, Tm, Yb, Lu, Y, Bi, and Cr. Metal ions and/or semiconducting elements having a quaternary valence include Ge, Zr, Hf, and Sn. Metal ions and inorganic non-metal elements having a valence of V that may be stabilized according to the present embodiments include V and P, metals with a valence of VI are Mo and W.

For example, the stabilizing polymer are soluble in the application liquid of choice, and can have ionic properties, chelating properties, and/or viscosity enhancing properties that interact with the inorganic material to promote uniform distribution in the liquid. Stabilizing polymers can help retain uniform distribution of the materials while the liquids are handled during application processes and/or while liquids are held in storage between processes. Some stabilizing polymers can have the useful property of reducing oxidation and/or precipitation of the inorganic material.

In embodiments where the inorganic material exists as an ion in solution, the stabilizing polymer can have ionic groups of the opposite charge so that the material forms an ionic association with the polymer. The solubility, suspension, and/or structural matrix (e.g., intertwined or cross-linked gel matrix) of the polymer can also help maintain uniform distribution of the ionic material in the application liquid. The ionic polymer can exchange with the counter ion of the ionic material to avoid solubility limitations of the ion with the counter ion. With the inorganic material ion associated (e.g., with ionic bonds) to the polymer, undesirable counter ions and other impurities can be removed from the application liquid, e.g., by ultrafiltration or dialysis. Ionic stabilizing polymers can include, e.g., polyanions, poly cations, mixed ionic polymers, peptides, nucleotides, polyethyleneimine (PEI), heparin, carboxylated polyethyleneimine (PEIC), polyethylene oxide, polyelectrolytes, polyacrylate, perfluorosulphonate, perfluorocaboxylate, acrylamide, polyacrylic acid, polyacrylonitrile, a polynucleotide, a protein, polycarbonate, diethylaminoethyl-dextran, dextran sulfate, polyglutamic acid, polyphosphate, polyborate, and the like.

Where the inorganic material is an ionic material, the stabilizing polymer can beneficially comprise some chelating character. Metal ions, such as ions of alkaline-earth metals and many transition metals, can be stabilized in the material combination solution by association with polymers having available chelating groups. For example, stabilizing polymers can have chelating groups, such as nitrilotriacetate (NTA), ethylene diamine tetraacetate (EDTA) groups, poly histidine, DMPS, DMSA. DMSO, Bipyridyl, Ethylenegly-col bis2-aminoethyl tetraacetic acid (EGTA), Hydroxyethy-lethylenediamine triacetic acid (HEDTA), and/or the like.

Where an inorganic material tends to form non-homogenous distributions in an application liquid (e.g., where the material is a particle, precipitates, adsorbs onto surfaces, or falls out of suspension), a viscous polymer or supportive polymer matrix can help maintain a uniform dispersal of the material in the liquid long enough to provide uniform, consistent or repeatable transfer and application to a substrate. Stabilizing polymers that enhance viscosity of application solutions can provide benefits when used in the methods and systems of the invention. The presence of viscous polymers in the application solution can help retain homogeneity of the material in the liquid. Settling of suspended, but insoluble, inorganic materials can be reduced in the presence of viscous polymers. Viscous polymers can reduce convection in the liquids, e.g., thus reducing exposure of the materials to undesirable reactants such as oxygen or water during storage of the liquid. Desirable viscosity enhancing stabilizing polymers increase the viscosity of the liquid by at least 50%, or enhance viscosity of the liquid by at least 10 centipoise (cP). Preferred viscosity enhancing stabilizing polymers are present in the liquid in amounts adequate to increase the viscosity by about 100 cP, by about 1000 cP, about $10^4$ cP, about $10^5$ cP, about $10^6$ cP, about $10^7$ cP or more. Stabilizing polymers described above can provide beneficial viscosity increases. Other useful viscosity enhancing stabilizing polymers include, e.g., hydroxyethyl starch (HES), dextran, dextrin, inulin, or polyvinyl pyrrolidone (PVP), polystyrene, and the like.

Another benefit derived from many viscosity enhancing stabilizing polymers is improved interaction between the combination solution and the substrate. Polymers can increase the affinity of the liquid for the substrate (e.g., make it more sticky) so it retains contact with the substrate after it is applied. The more viscous liquids can flow more slowly so they don't migrate excessively from array locations during processing steps.

In other embodiments, inorganic materials are retained in homogenous solutions by selection of solvents and/or counter ions that help avoid precipitation of the material. For example, many metals have enhanced solubility in solution as nitrates. Optionally, certain nonaqueous solvents (e.g., organic or silicone solvents) can be employed to retain some materials in solution.

Master Arrays

Master arrays include inorganic materials combinations held at two or more locations as solutions. Because the array members are in liquid form, the master array locations generally require some form of containment, such as, e.g., wells, containers, repellant surfaces, wetting surfaces, and/or borders to migration of the liquid. The materials combinations can be prepared at locations separate from the master array, but the combinations are typically prepared in-situ at the array locations.

Preparation of a master array typically starts with formulation of inorganic materials stock solutions. Concentrated forms of the inorganic materials (e.g., high grade pure liquid solutions or material salts) are dissolved or blended with a solvent to provide a stock solution or suspension of known molarity. Depending on the material, preparation of the stock solution can require adjustment of pH, heating, addition of solubilizing counter ions, addition of surfactants, addition of stabilizing polymers, agitation, etc., to provide a homogenous stock liquid.

Stock solutions of the inorganic materials can be combined in different combinations and/or proportions at different master array locations to provide a master array. The arrays are often matrix style arrays arranged in rows and columns. For example, each row and each column of an array can include different inorganic materials. A first material, at each location in a particular row can mix with different materials in each column. A second material, in each location of another row, can also be mixed with the different materials in each column. With different materials in each row and column, a master array can be provided with different combinations of materials at each location. Optionally, the stoichiometry of combinations can be considered, e.g., by including different amounts of materials in different locations, rows, and/or columns, thus providing combinations of the same materials in different proportions at different locations. Optionally, master arrays can be less regimented, e.g., with redundant combinations at two or more locations, empty locations, arrays not in rows or columns, random combinations, random proportions, etc.

Combinations at master array locations can be prepared manually. A technician can transfer defined amounts of stock solutions to master array locations using a pipettor, multipipettor, repeat pipettor, programmable pipettor, and/or the like. For example, a technician can use a 12-tip multiple pipettor to transfer a first stock solution of material to an entire row of a 96-well plate at once. Different stock solutions can be transferred to the 7 remaining rows of the 96-well plate using the 12-tip pipettor. Using 8 tips in the pipettor, the technician can transfer different stock solutions a column at a time to the 12 columns of the plate. The result can be an array of 96 different combinations of materials in the plate. Optionally, more than two different materials can be combined at any particular master array location. Optionally, any or all the rows or columns can have different amounts of certain materials, e.g., to provide an array with different reaction stoichiometry of the same materials combinations at different locations. A single multiwell plate, or portion of a plate, can be considered a master array. Two or more plates, or portions of plates, can be considered a master array.

Master array mother plates can be prepared with a relatively large volume of combined materials at each location. Aliquots of the mother plate can be transferred to one or more daughter plates, e.g., for immediate use as master arrays, while the mother plate is stored away (e.g., frozen or refrigerated) for later uses.

Master arrays can be prepared using automated or semi-automated techniques. Particularly for very large arrays, automated combination of materials can provide advantages in the cost, speed and reliability of master array preparation. Typically, automated array preparation (e.g., robotic preparation) progresses in a fashion similar to the manual techniques described above. A robot can provide stock solutions sequentially, e.g., by repeated dipping and transfer steps, or by transfer from a conduit containing a segregated stream of different stock solutions.

Master arrays can vary widely in the number and arrangement of array locations. Master arrays prepared manually, for example, can comfortably include different materials combinations at two locations, about 8 locations, about 96 locations, about 384 locations, or more. Robotic liquid handling devices can readily prepare master arrays of combined inorganic materials with unique combinations and/or materials proportions in numbers ranging, e.g., from less than about 24 locations, to about 96 locations, to about 384 locations, to about 1536 locations, or more. By using multiple master array plates and/or by employing a micro array format, master arrays can include large numbers of unique array combinations, e.g., from about 100 combinations, to about $10^3$ combinations, to about $10^4$ combinations, to about $10^5$ combinations, to about $10^6$ combinations, to about $10^7$ combinations, to about $10^8$ combinations, or more, having significantly different combinations and/or materials proportions. In certain embodiments, a master array can have, e.g., from about 0.01 to 10 or more array combinations per millimeter, or from about 0.1 to 100 or more array combinations per mm$^2$.

Substrates

A substrate is generally a rigid or semi-rigid material having a surface onto which liquids containing inorganic materials can be applied. Substrates can have a shape suited to, e.g., particular array replication processes, and component reaction and analysis techniques. Substrates can be formed from materials that tolerate handling and process conditions, such as high temperatures and exposure to liquids.

Substrates are typically thermostable solids having a flat material application surface. For example, a substrate can be a flat ceramic disk not substantially deteriorated by temperatures of between about 450° C. and 2000° C. in the presence of air. In other embodiments, substrates can be fabricated from, e.g., glass, metal, graphite, silicon, alumina, carbon composites, ceramics, polymers, and/or the like. The substrate can be shaped like a disk, a card, a cylinder, a sphere, a cube, etc. In some embodiments, the substrate can be in the form of two or more beads.

The surface of a substrate can have locations suitable for processing, holding, and presenting a combinatorial array of inorganic compositions. The surface can be smooth and uniform, e.g., to provide easy precision contact with devices used in certain replication processes. The substrate surface can be rough or porous to absorb and/or hold applied materials. The substrate surface can have locations defined by borders, such as, e.g., channels, ridges, hydrophobic regions, hydrophilic regions, and/or the like, to retain transferred materials at a particular location in a replicate array.

The surface can include, e.g., reference markers useful in orientation of application devices. For example, the edge of the surface can include physical references, such as holes, slots, or pins that interact with an application device frame to hold the substrate in place relative to the device as materials are applied to the surface. The reference markers can be, e.g., two or more dots, or other indicia printed on the surface for alignment with certain points on an application device stage, for precise manual placement of the substrate in an application device, or for detection by an imaging system to confirm proper alignment of the substrate in an application device.

Replicate Arrays

Replicate arrays are arrays of liquid solutions transferred to a substrate from a master array. The replicate array can include all or a portion of the master array members. The replicate array can be arranged the same as the master array, or it can have array members (combinations from a particular array location) located in a different arrangement. Transfer of combinations from a master array to a replicate array can be direct or indirect, sequential or at once, as described above. Replicate arrays can be processed to react combined materials to form different product compositions at various locations on the substrate.

Depending on the technique of materials combination transfer from a master array, a replicate array can have substantially the same arrangement of combinations at the master array, or the replicate array can have a different arrangement. For example, in the case where a transfer block is used to transfer all master array members at once to a substrate, the result is typically a replicate array with substantially the same topographic order and spacing of locations as the master array. In some cases of direct transfer between a master array and replicate array (e.g., sealed contact and inversion, as described above), the mirror image replicate can have an inverted order of array members while retaining substantially the same spacing as the master array. In some embodiments, e.g., in certain sequential transfer techniques, the members of the replicate array are transferred to locations closer together and/or in different order than in the master array.

In one aspect of the invention, a large master array, possibly contained on two or more multiwell plates, can be replicated on a relatively small single substrate. For example, a robot can sequentially transfer combinations spaced 1 cm apart on master array plates to locations 1 mm or less apart on a replicate array substrate. Optionally, all or a portion of master array members on one or more master array plates can be transferred to substrate locations of a replicate array having an area about 2-fold, 10-fold, 100-fold, or 1000-fold less than the area taken up by the same materials combinations in the master array. Locations on a replicate array can have a density of 1 location per cm$^2$, 4 locations per cm$^2$, 16 locations per cm$^2$, 100 locations per cm$^2$, 10,000 location per cm$^2$, or more.

Replicate arrays can vary widely in the number and arrangement of array locations. A replicate array, on one or more substrates, can include all or a portion of the members of one or more master arrays. For example, a replicate array of combined inorganic materials from one or more master arrays can include unique combinations and/or materials proportions at, e.g., from less than about 8 locations, to about 24 locations, to about 96 locations, to about 384 locations, to about 1536 locations, or more. By using multiple replicate array substrates or by employing a micro array format, replicate arrays can include large numbers of unique array combinations at different locations, e.g., from about 100 combinations, to about $10^3$ combinations, to about $10^4$ combinations, to about $10^5$ combinations, to about $10^6$ combinations, to about $10^7$ combinations, to about $10^8$ combinations, or more, having significantly different combinations in a replicate array library.

Transfer steps can be repeated to prepare more than one replicate plate having substantially the same population of material combinations. For example, sequential transfer operations can be repeated to provide additional replicate arrays from the same master array. In another embodiment, parallel transfers, such as transfer block transfers, contact and inversion transfers, or offset printing transfers, can be repeated to provide two or more replicate plates, e.g., with the same population of material combinations.

Reaction of Combined Materials

Mixtures of two or more different inorganic materials in a liquid solution form at replicate array locations (e.g., an array of liquid of inorganic materials combinations) can be reacted to form a combinatorial array of reaction product compositions. In some cases, the different materials will react spontaneously on contact with other materials, e.g., in the wells of a master array. In many cases, reaction of the material combinations is initiated by exposure of the replicate array to certain physical or chemical conditions. The term "reaction" as used herein, refers to chemical and/or physical combination of inorganic materials at an array location forming, e.g., a reaction product composition molecule, crystal, amalgam, sinter product, or alloy of the materials. Reactions at array locations on a substrate can occur simultaneously or sequentially depending, e.g., on the nature of the reaction and the conditions necessary for the reaction.

Reactions, at least in part, can include chemical reaction of the inorganic material mixtures with each other and/or with other process constituents. For example, reaction of two elemental metals at an array location can include oxidation of the metals by atmospheric oxygen present in the environment or by chemical oxidizers present in the combined solution or suspension of materials.

In some embodiments, a reaction takes place when liquids in the materials combination vaporize to leave the inorganic materials concentrated together at the array location. For example, loss of hydration water can cause some mixtures of materials to react with each other. In other cases, loss of application liquid solvents can expose the materials to external reactants to allow co-reaction of materials, e.g., with water or oxygen from the atmosphere.

In embodiments where one or more of the inorganic materials is associated with a stabilizing polymer, reactions can take place when the polymer is removed, e.g., by vaporization. For example, in cases where the inorganic material is associated by ionic interaction with a charged polymer, the material can fail to react with other materials at the location until the polymer is removed by heat. The process of polymer removal can be accelerated by the presence of oxygen in the environment (i.e., the polymer is "burned" away).

In further embodiments, the reaction can include sintering together of the combined inorganic materials on the replicate array substrate. In sintering, the dried liquid solutions are brought together at a temperature below their melting points, but at a temperature high enough for interactions to form solid phase of desired inorganic materials. The result can be, e.g., a microscopically porous heterogeneous or homogenous crystal structure. In the presence of oxygen, the sintering process can also result in oxidation of one or more of the inorganic materials.

In still further embodiments, the reaction can include melting together of combined inorganic materials. The reaction product of the melting can be, e.g., an amalgam, crystal, or alloy. In some cases, certain inorganic materials will melt together without added heat. In many cases, added heat is required to melt mixed inorganic materials together. In the case of combinations of materials that are each pure elemental metals, the mixed composition can melt at a temperature lower than the melting temperature of either pure metal, due to the effects of colligative properties on melting temperatures. Melting together of pure metals can result in amalgam or alloy reaction products, particularly when the local environment does not contain oxidizing agents. In the presence of oxidizing agents (such as atmospheric oxygen) the melted metals can become oxides, resulting in, e.g., metal oxide crystal reaction product compositions.

In many embodiments of the invention, reaction of combined materials depends on raising the substrate to a temperature above ambient conditions. For example, reactions can be initiated by heating the substrate to a temperature greater than about 300° C., greater than about 450° C., greater than about 500° C., greater than about 750° C., greater than about 1000° C., greater than about 1200° C., greater than about 1500° C., greater than about 1750° C., or greater than about 2000° C. This can be accomplished by, e.g., heating the substrate in an oven, resistive heating or hot gasses in contact with the substrate, microwave radiation, by radiant heating, etc. In some embodiments, the combined materials can be reacted by heating the materials without substantial heating of the substrate. For example, material combinations at array locations can be rapidly heated to reaction temperatures by exposure to infrared radiation, heated fluids, or laser light.

In some embodiments, reaction and processing can further include epitaxial growth of materials from locations on the array. Combinatorial arrays on substrates can be loaded to chambers for growth of crystals by, e.g., physical vapor deposition (PVD), molecular beam epitaxy (MBE), chemical vapor deposition (CVD) techniques, and the like.

Analysis of Combinatorial Arrays or Product Compositions

Combinatorial arrays of inorganic material compositions can be analyzed to detect array locations having product compositions with desirable characteristics. The method of detection often depends on the characteristic of interest. For example, compositions at array locations can have optical characteristics, phosphorescence, crystal nucleation, superconductivity, and/or semiconductor characteristics. Combinatorial compositions at array locations can be examined, e.g., by spectroscopy, with electromagnetic sensors, by microscopy, by detecting a voltage, by detecting a voltage in response to a pressure, by detecting a voltage in response to exposure to light, by detecting a voltage in response to a temperature, by detecting electrical resistance, by fluoroscopy, and/or the like.

Analysis of inorganic compositions at array locations can be sequential or can be carried out in parallel. Compositions can be robotically tested for characteristics, such as resistance to electric current flow, by grounding the substrate and manually or robotically contacting compositions to run a resistance test at each location. Certain optical qualities can be tested in parallel using image processing equipment. For example, phosphorescence can be detected by illuminating a combinatorial array with an excitation wavelength followed by monitoring of array locations for emission of desired light wavelengths using a CCD based camera and video monitor.

In a particular embodiment, two or more replicate arrays are prepared and each is processed under different reaction conditions. Analyses of the reaction product compositions can help identify mixture combinations and processing conditions providing compositions preferred for particular uses. For example, one replicate array can be treated with a temperature, a time, a pH, a pressure, exposure to a light frequency, exposure to a metal vapor, exposure to a solvent, or exposure to a gas, that is different from treatment of another copy of the replicate array. Analysis of the differently processed combinatorial arrays can provide data useful in designing or optimizing manufacturing processes for combinatorial materials in the array. Analysis of the differently processed arrays can identify compositions most suited to a particular application, such as a composition having the most intense phosphorescence at a particular wavelength in response to excitation with a selected wavelength.

Systems for Preparing Combinatorial Arrays

Systems for preparing replicate arrays of inorganic material combinations can include master array, a substrate and a transfer devices to replicate the master array on the substrate surface. The systems can include reactors and detectors to produce and analyze product compositions.

Figure 1:
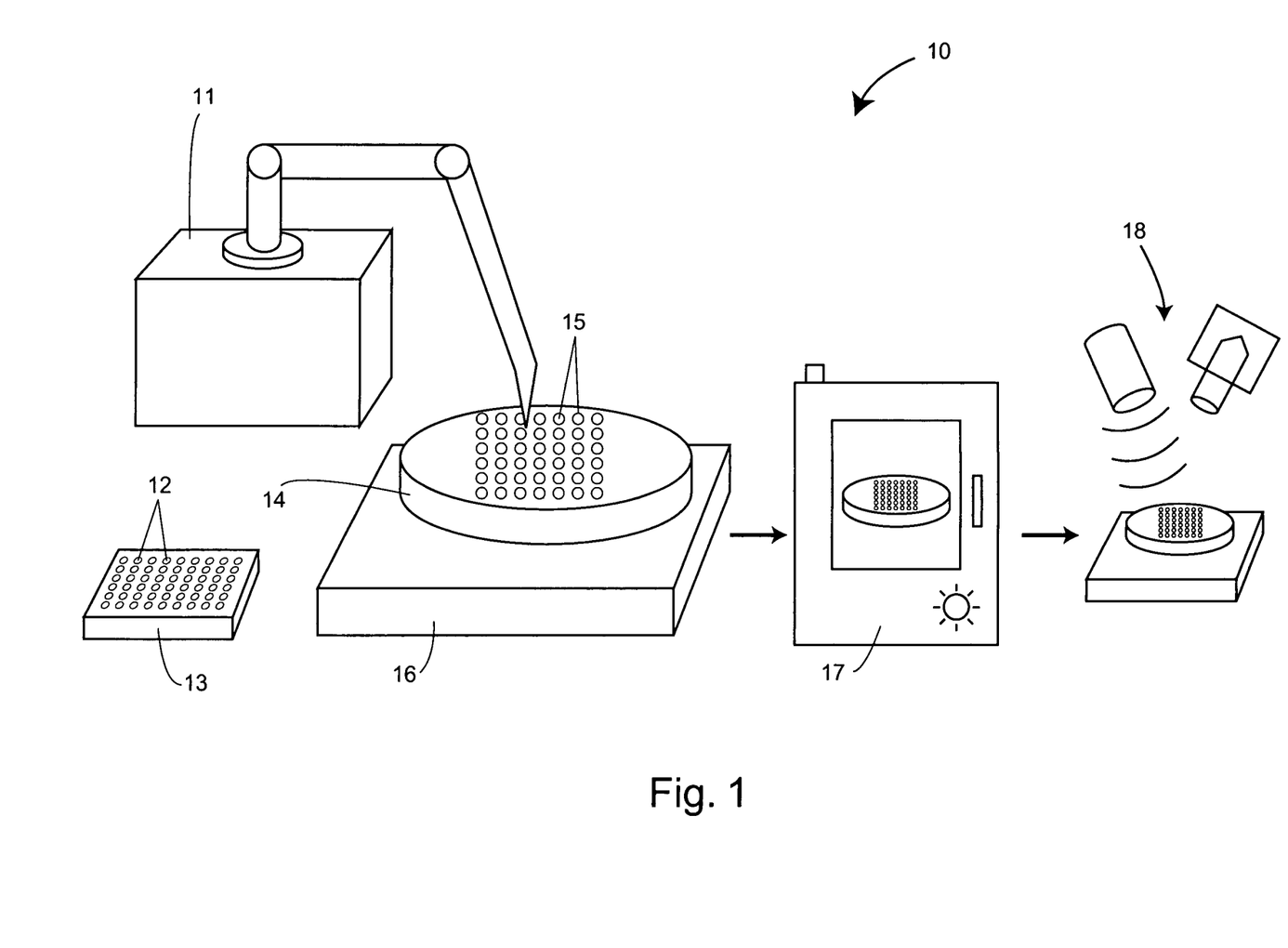
FIG. 1 shows a schematic diagram of an exemplary robotic system for preparing replicate arrays of liquid solutions, and for reaction and analysis of associated inorganic product composition combinatorial arrays.

In one embodiment, system 10 of the invention can include transfer device 11 to transfer master array liquid material combinations 12 from master array 13 to locations on a substrate 14, thereby providing replicate array 15, as shown in FIG. 1. For example, a system for preparing a replicate array can include a robot that sequentially samples aliquots of master array materials combinations from locations in the master array and transfers them to replicate array locations on the surface of a substrate. The robot can exactly replicate the physical layout of the master array onto the substrate. Optionally, the robot can transfer the aliquots of combined materials to the substrate surface in a different spatial arrangement from that of the master array.

The systems can include heaters and/or ovens, e.g., to process, dry, or react combinations of materials at array locations. For example, replicate array can be dried in drier 16 then the substrate transferred to oven 17 to be reacted, e.g., at high temperatures to sinter together the materials into a combinatorial array of product compositions. Depending on the materials and desired product compositions, various heaters can be used to dry, chemically react, melt, fuse, crystallize, or sinter two or more materials at an array location.

The transfer devices can be any means known in the art to transfer master array members to locations on a substrate. The transfer devices can include those described above in the Methods of Preparing Replicate Inorganic Combinatorial Arrays section. The transfer devices can be by wetting contact with a transfer device, such as a pin head or capillary tube, followed by contact of the device with the substrate. The transfer means of the device can be by direct contact on a substrate surface with the master array members. Transfer means can be by contact of a transfer surface with the master array members followed by contact of the transfer surface with the substrate (offset printing). Transfer means can include pumping master array aliquots through a conduit from master array locations to replicate array locations on a substrate. For example, a sipper tube can be robotically positioned over master array locations to aspirate aliquots from the master array. The aliquots can be pumped in conduit to exit a capillary tube at the end of a robotic arm or X-Y Plotter to be expelled onto the substrate surface at replicate array locations. An optional transfer means, for some embodiments, includes sequential transfer of master array aliquots by a technician using a hand operated pipettor.

Systems of the invention can include analytical devices (detecting devices) 18 to determine characteristics of combinatorial array product compositions. Characteristics typically of interest include, e.g., light excitation and/or emissions profiles associated with composition absorbance, fluorescence, phosphorescence, luminescence, etc.; electronic responses, such as, resistance to electric current flow, piezoelectric effects, rectification, dielectric characteristics, photoelectric effects, junction effects, superconductivity at temperatures, etc.; chemical and biological catalytic activities; crystal nuclei behavior; and/or the like. The analytical devices can comprise, e.g., ohm meters, fluorometers, volt meters, ammeters, photometers, charge coupled devices, magnetometers, enzymes, microscopes, and the like.

EXAMPLES

The following examples are offered to illustrate, but not to limit the claimed invention.

Example 1

Printing an Array of Liquid Inorganic Materials Solutions

A combinatorial array of inorganic phosphors was prepared and analyzed for photo luminescent properties after excitation by various radiation sources.

An experiment in inorganic material combinations was designed to evaluate combinations of six inorganic materials with six other inorganic materials in a multi-well format. Group A inorganic materials were selected to be Sr, Gd, Y, Pb, Bi, and Ba. Group B inorganic materials were selected to be B, Ga, Si, Al, Mo, and P. Stable nitric solutions were used for Sr, Ga, and Al. Polymer stabilized nitric solutions were used for Gd, Y, Pdb, Bi, Ba, and Mo. $(NH_4)_2SiF_6$ solution, $(NH_4)_2H_2PO_4$, and $HBO_3$ solutions were used for Si, P and B, respectively.

Various combinations of two Group A materials with combinations of two Group B materials, along with 0.05 equivalents of Europium (Eu) were prepared in multiwell dishes by manual pipetting techniques in multi-well plates. The resultant master array of inorganic materials combinations was mixed by orbital shaking.

Figure 2:
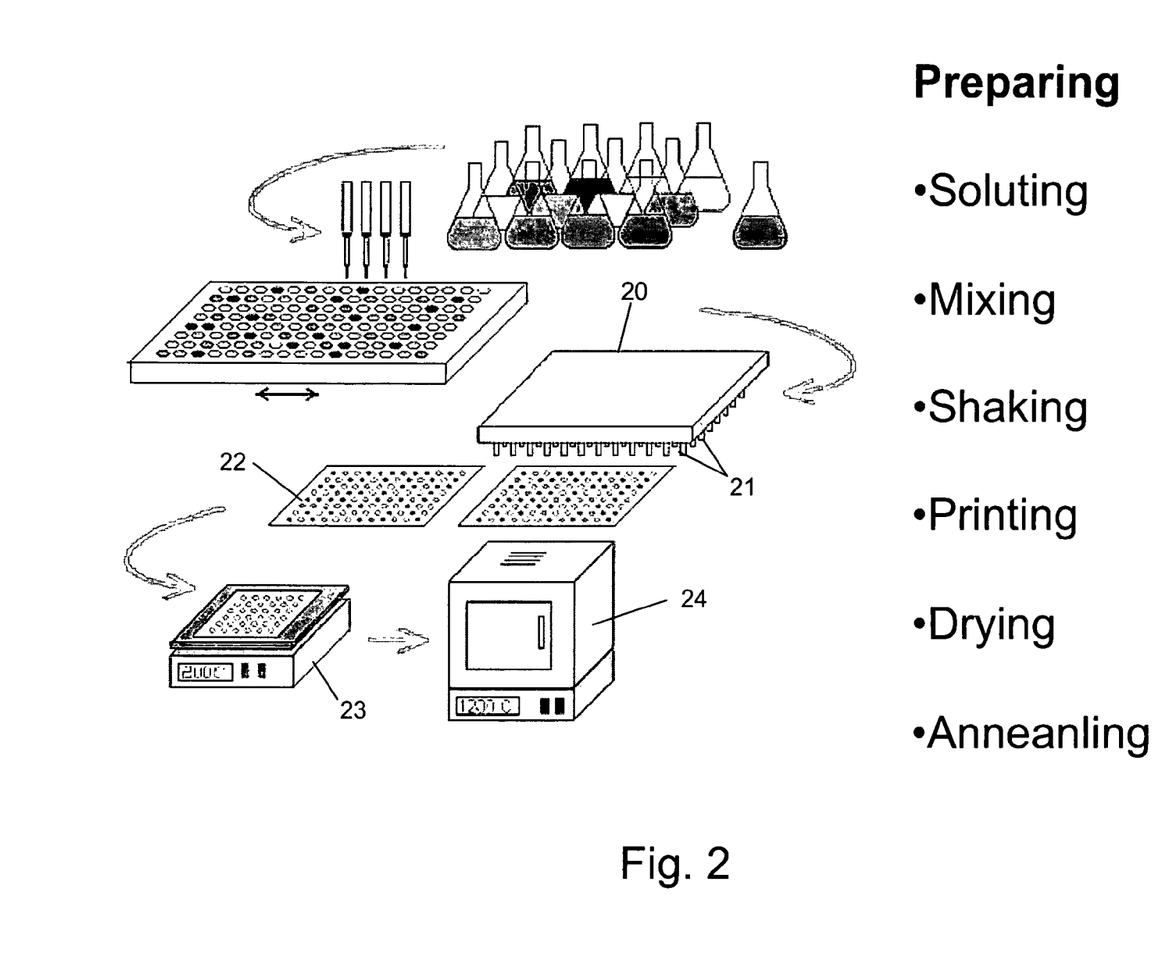
FIG. 2 shows schematic diagrams and images showing process steps to prepare replicate arrays by parallel transfer of liquid solutions from a master array to a replicate array on a substrate.

Replicate copies of the multiwell plate liquid arrays were printed in parallel onto substrates having 384 array locations, as shown in FIG. 2. This was accomplished using a transfer block 20 having an array of 96 pin heads 21 mounted on a backing plate in register with the spacing of wells in the 96-well plates. The pin heads were dipped all at once into the 96 wells of combined inorganic materials and then they were contacted with the surface of the substrate 22 to transfer a sample of liquid material from each well to the substrate. Transfers were made from three additional 96-well plates of liquid materials to complete population of the substrate's 384 array locations. The parallel transfer process was repeated to prepare additional replicate arrays on substrates.

The liquid materials on the two replicate substrate arrays were dried at 200° C. on a hot plate 23 then reacted (sintered) with heat at 1200° C. in a furnace (oven) 24 to sinter the mixed inorganic materials at array locations.

Figure 3:
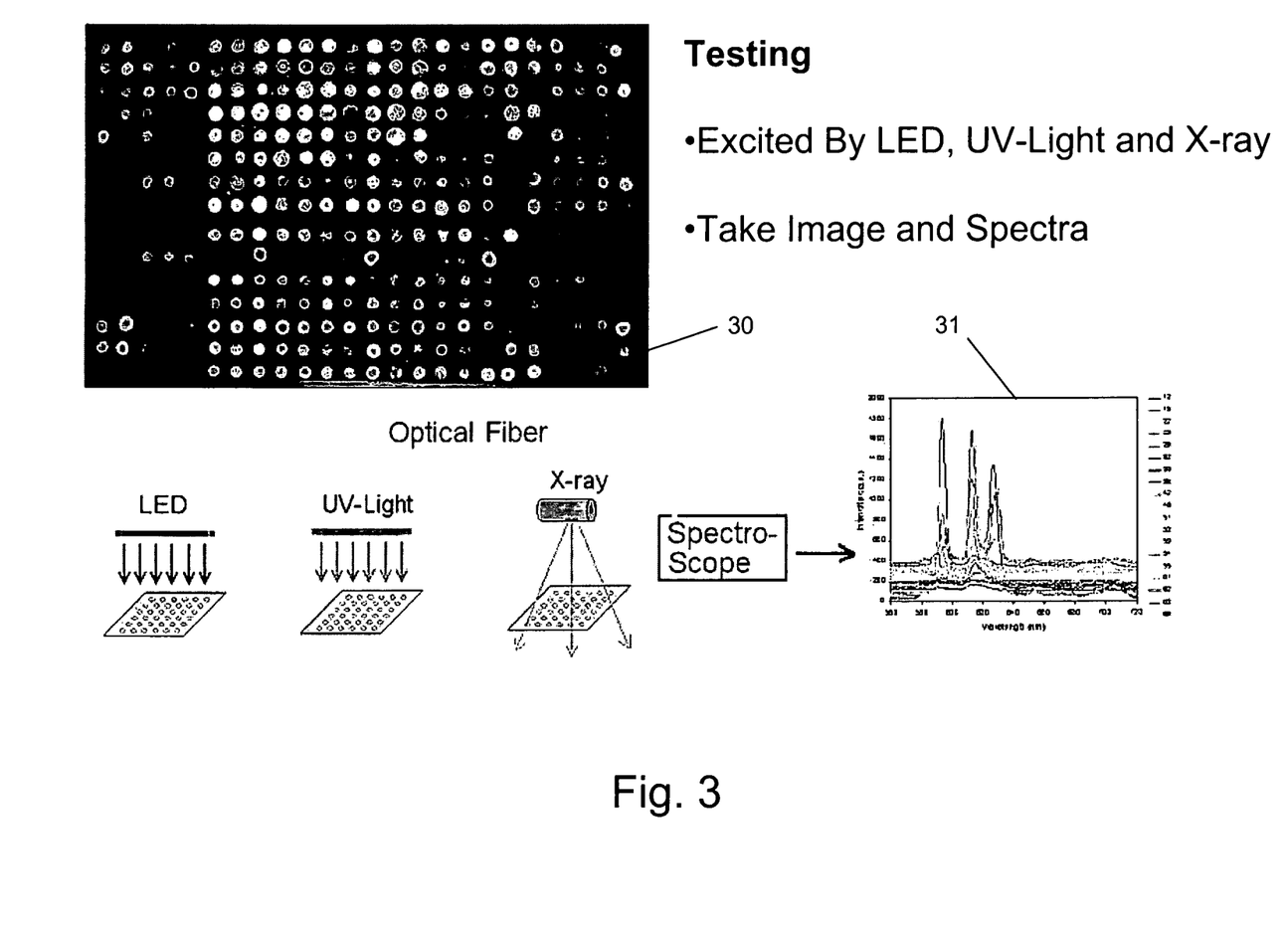
FIG. 3 shows an image of an illuminated array of phosphor product compositions and schematic diagrams of detection techniques.

The product compositions were analyzed for phosphorescent properties by illuminating the substrates and viewing them through optical filters. The arrays were screened for the ability to phosphoresce in response to light (460 nm) from an LED, ultraviolet light, and X-rays. Digital images 30 of phosphorescence at each array location were taken, as shown in FIG. 3. Spectroscopic scans 31 of phosphorescent intensity across a range of wavelengths were plotted for phosphors at each array location, and for each excitation light source.

The library of data acquired from this experiment can be reviewed to select promising phosphors for particular uses. For instance, preferred combinations and proportions of inorganic materials could be identified for peak intensity phosphorescence at 500 nm in response to excitation with UV light. A different combination of inorganic materials with certain proportions could be found, e.g., with peak intensity phosphorescence at 650 nm in response to excitation with a blue LED.

Example 2

Process Optimization by Testing of Replicate Arrays

Replicate arrays of liquid solutions were printed to substrates from a master array and preferred processing conditions and phosphor formulations were identified on analysis of the replicate arrays.

A master array of material combinations was manually prepared based on the formulas $(A_{1-X-Y}B_XC_Y)Z$ and $(C_{1-X-Y}B_XD_Y)Z$ were prepared in multi-well plates, where A, B, C, and D are 2+ valance metal ions and Z are silicon or aluminum. An array of liquid solution aliquots were transferred from the master array in parallel using a transfer block onto a substrate to provide a 16 row by 16 column replicate array of the material combinations. A second replicate array of the master array transferred to a second substrate. The first replicate array was sintered at 1100° C. to react mixed inorganic materials at array locations, and the second replicate array was sintered at 1200° C.

Figure 4:
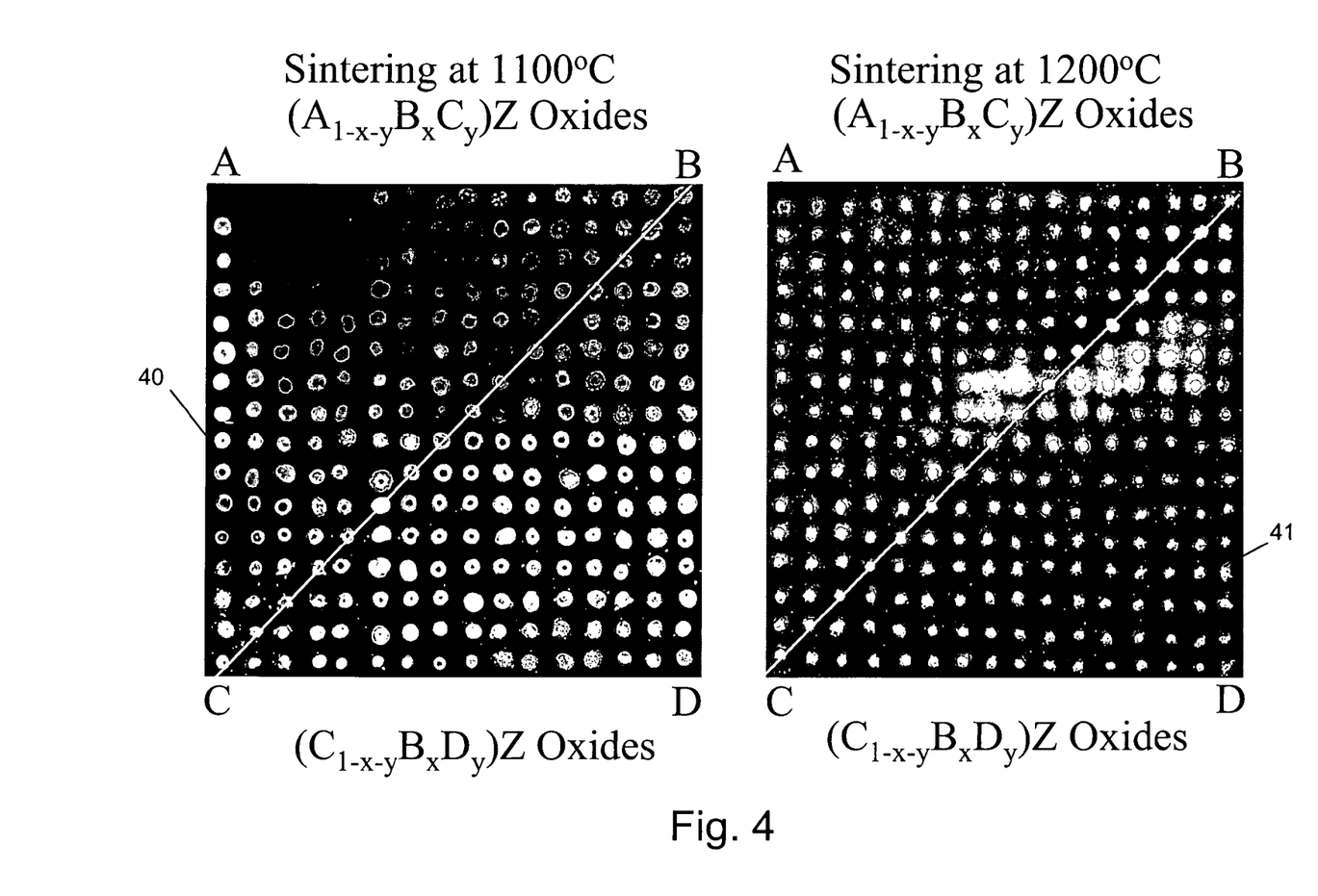
FIG. 4 shows images of replicate arrays processed under different conditions to provide combinatorial arrays of product compositions having different characteristics.
Figure 5:
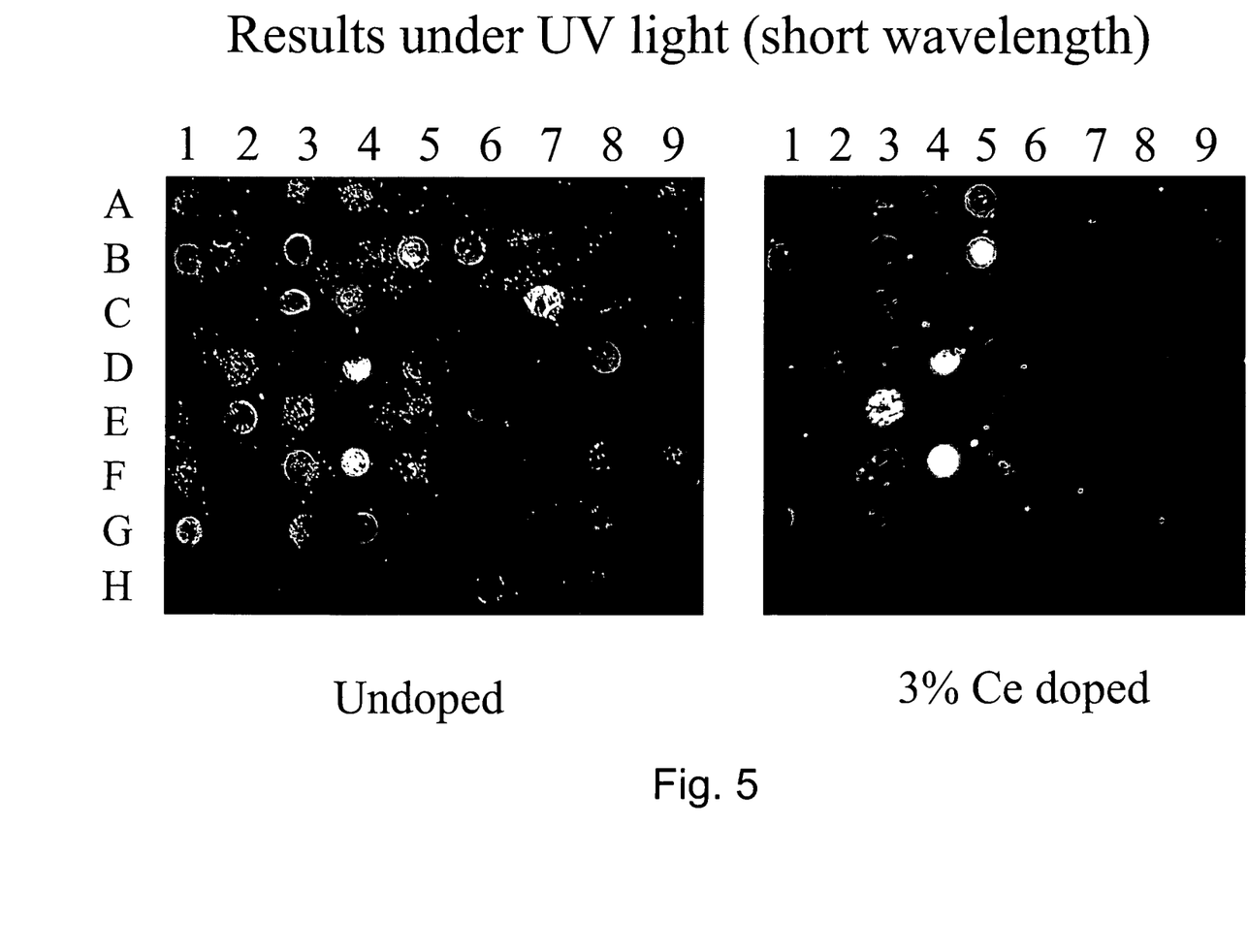
FIG. 5 shows arrays of product compositions prepared from replicate arrays.

The combinatorial arrays of product compositions on each substrate were illuminated at 356 nm and imaged a digital camera. Some mixtures of materials were not effectively reacted at 1100° C. to provide significant phosphoresce with the tested excitation and emission wavelengths (see array 40, FIG. 4). However, several more formulations of inorganic material combinations produced compositions effectively phosphorescent under the cited conditions when reacted at 1200° C. (see array 41). Some formulations had higher intensity when sintered at 1100° C. and others had more intensity when sintered at 1200° C. Many of the product compositions demonstrated different emission wavelengths (i.e., apparent colors on visual inspection) depending on the reaction temperature.

Replicate array duplicates can be used to improve processes or to screen materials/conditions combinations that provide desired results. Replicate arrays can be processed under a variety or different conditions, e.g., of reaction temperature, reaction time, presence or absence of certain gases, etc. Resultant product composition arrays can be analyzed for desired characteristics, including emissions intensity at a particular wavelength in response to selected excitation wavelengths.

Example 3

Preparation and Analysis of Scintillator Libraries

Solutions of combined mineral salts and stabilizing polymers were prepared in multiwell plate master arrays and transferred to substrates. The combined materials were baked to form product phosphor compositions. The compositions were analyzed for phosphorescent properties.

A stabilizing solution was prepared from 3.5 g of stabilizing polymer (PENE) and 1.7 g EDTA dissolved in 50 ml of deionized water. Metal salts solutions were mixed with the stabilizing solution to prepare stock solutions of the metals. Stock solutions were further stabilized by appropriate pH adjustment using $HNO_3$ or $NH_4OH$. A master array of combined materials was prepared in a 96-well plate by manually mixing the stock solutions of metals in proportions to provide the desired formulas shown in Table 1, below. An identical master array of solutions was prepared in another 96-well plate, but doped with Ce at 3% by weight.

TABLE 1

Library Composition Formulas

| | 1 | 2 | 3 | 4 | 5 | 6 | 7 |
|---|---|---|---|---|---|---|---|
| A | $K_8(AlSiO_4)_6Cl_2$ | $KBi_6O_9Cl$ | $Eu_2Cl_2(SiO_3)$ | $Ba_3BiO_3Cl_3$ | $Cd_{0.5}Bi_4O_4Cl_5$ | $Ce_3VO_4Cl_6$ | $Pb_2Bi_3Nb_2O_{11}Cl$ |
| B | $SrBiO_2Cl$ | $La_3(Si_2O_7)Cl_3$ | $Pb_5(PO_4)_3Cl$ | $BaBi_4O_6Cl_2$ | $Cd_{1.4}Bi_{1.4}O_2Cl_3$ | $La_3VO_4Cl_6$ | $Bi_6NbWO_{14}Cl$ |
| C | $Sm_3(SiO_4)_2Cl$ | $BiSr_3O_2Cl_3$ | $Pb_5(VO_4)_3Cl$ | $LaTaO_4Cl_3$ | $LiBi_3O_4Cl_2$ | $Bi_2YO_4Cl$ | $PbBi_3WO_8Cl$ |
| D | $Rb_2(NbOCl_5)$ | GdOCl | $Ce_3TaO_6Cl_3$ | $GdWO_4Cl$ | $SrBi_3O_4Cl_3$ | $Ca_{2.7}Bi_{1.7}O_4Cl_4$ | $YWO_4Cl$ |
| E | LaOCl | YOCl | $Bi_2(BiPb)WO_8Cl$ | $LaWO_4Cl$ | $Eu_2(B_5O_9)Cl$ | $Pb_3WO_5Cl_2$ | $Rb_2WO_2Cl_4$ |
| F | $NbOCl_2$ | $Cs_3OCl$ | $Bi_4NbO_8Cl$ | $La_3WO_6Cl_3$ | $CdBiO_2Cl$ | $La_2Ta_2Cl_3O_4$ | $Cs_2WO_3Cl_4$ |
| G | $Cs_{191}Lu(Nb_6Cl_{11.17}O_{0.83})Cl_6$ | $LiEu(SiO_4)Cl_3$ | $BaBiO_2Cl$ | $PbBiO_2Cl$ | $Bi_9P_2ClO_{18}$ | $Nd_{7.33}Ta_8O_{28}Cl_6$ | $NdWO_4Cl$ |
| H | $Bi_3ClO_4$ | $Eu_5Cl_6(SiO_4)$ | $Sm_2(Ta_2Cl_2O_7)$ | $Cd_{05}Bi_6O_6Cl_7$ | $Bi_9V_2ClO_{18}$ | $Bi_5Cl_5PbO_6$ | $Rb_2(TaO_2Cl_5)$ |

Liquid solutions in the 96-well plate were transferred in parallel to the surface of a ceramic substrate on pin heads of a transfer block. The substrates were baked in a furnace at about 1200° C. for 6 hours to form the product compositions.

The arrays of scintillator product compositions thus obtained were viewed under illumination with ultraviolet light. Product compositions with intensity and color desirable for a particular purpose can be selected. Further screening for an optimal formulation can include comparison of the selected formula to similar formulas, e.g., with minor adjustments to component proportions. Selected formulas can be scaled up for practical testing and use.

While the foregoing invention has been described in some detail for purposes of clarity and understanding, it will be clear to one skilled in the art from a reading of this disclosure that various changes in form and detail can be made without departing from the true scope of the invention. For example, many of the compositions, techniques and apparatus described above can be used in various combinations.

All publications, patents, patent applications, and/or other documents cited in this application are incorporated by reference in their entirety for all purposes to the same extent as if each individual publication, patent, patent application, and/or other document were individually indicated to be incorporated by reference for all purposes.

What is claimed is:

1. A method of preparing replicate arrays of liquid solutions, the method comprising:
preparing a master array of liquid solutions comprising one or more inorganic materials, each liquid solution having a unique address in the master array;
transferring a replicate array of the master array onto a first substrate; thereby producing a first replicate array of the liquid solutions;
stabilizing at least one of the inorganic materials with a stabilizing polymer that is not a chelator; and,
transforming the replicate liquid solutions into a solid product composition reaction product of two or more different inorganic materials.

2. The method of claim 1, wherein preparing the master array comprises combining at least two different metal compounds at each address of the master array.

3. The method of claim 1, wherein the master array comprises at least eight addresses.

4. The method of claim 1, wherein each liquid solution of the master array is contained within one well of a multiwell dish.

5. The method of claim 1, wherein the solid inorganic materials comprise one or more metals selected from the group consisting of Aluminum, Antimony, Barium, Bismuth, Boron, Cadmium, Calcium, Carbon, Cerium, Chromium, Cobalt, Copper, Dysprosium, Erbium, Europium, Gadolinium, Germanium, Gold, Hafnium, Holmium, Indium, Iridium, Iron, Lanthanum, Lead, Lithium, Lutetium, Magnesium, Manganese, Molybdenum, Neodymium, Nickel, Niobium, Palladium, Platinum, Polonium, Praseodymium, Rhenium, Rhodium, Ruthenium, Samarium, Scandium, Selenium, Silicon, Silver, Strontium, Tantalum, Tellurium, Terbium, Thallium, Thulium, Tin, Titanium, Tungsten, Vanadium, Ytterbium, Yttrium, Zinc, and Zirconium.

6. The method of claim 5, wherein the inorganic material is in an oxidized form.

7. The method of claim 5, wherein the inorganic material in an ionic form.

8. The method of claim 1, wherein the substrate is selected from the group consisting of a ceramic, a glass, silicon, quartz, graphite, a carbon composite, a polymer, a plastic, a composite, a compound semiconductor, a metal, and a metal compound.

9. The method of claim 1, wherein the liquid solutions of the master array are transferred to the replicate array in series.

10. The method of claim 1, wherein the liquid solutions of the master array are transferred to the replicate array in parallel.

11. The method of claim 10, wherein the parallel transfer comprises contacting the master array with a transfer block, and then contacting the substrate with the transfer block.

12. The method of claim 1, further comprising heating the substrate to a temperature above about 20° C.

13. The method of claim 1, wherein the replicate array of liquid solutions is transformed into the product array of solid inorganic materials by drying.

14. The method of claim 1, wherein the replicate array of liquid solutions is transformed into the product array of solid inorganic materials by chemical reaction.

15. The method of claim 1, further comprising detecting a signal from at least one of the solid inorganic materials in the product array.

16. The method of claim 15, wherein the signal is detected using a technique selected from the group consisting of electrical voltage measurement, electrical current measurement, a measurement of magnetic properties, spectroscopy, microscopy, and fluoroscopy.

17. A method of preparing replicate arrays of liquid solutions, the method comprising:
preparing a master array of two or more different inorganic materials in liquid solutions comprising a stabilizing polymer that is other than a chelator, each liquid solution having a unique address in the master array;
transferring at least a first portion of each of the liquid solutions from the master array to a first substrate to form a first replicate array of liquid solutions;
transferring at least a second portion of each of the liquid solutions from the master array to a second substrate to form a second replicate array of liquid solutions;
using a first process to transform the first replicate liquid solutions into a first product array of solid inorganic materials;
using a second process to transform the second replicate liquid solutions into a second product array of solid inorganic materials; and
detecting a signal from at least one address of the first product array, and comparing that signal to a signal detected from the corresponding address of the second product array.

18. The method of claim 17, wherein the first and second process parameters are selected from the group consisting of temperature, pressure, time, radiation exposure, chemical reaction, solvent exposure, and gas exposure.

19. The method of claim 18, wherein the signal detected from the at least one address of the first product array, and the signal detected from the corresponding address of the second product array, is carried out using a technique selected from the group consisting of electrical voltage measurement, electrical current measurement, a measurement of magnetic properties, spectroscopy, microscopy, and fluoroscopy.

20. The method of claim 1, wherein said transforming comprises drying.

21. The method of claim 1, wherein said transforming comprises sintering.

22. The method of claim 1, wherein said transforming comprises reacting chemically.

23. The method of claim 1, wherein the master array comprises two or more different inorganic materials combinations, which combinations are located at different positions in the master array.

24. The method of claim 1, wherein at least one inorganic material component of the master array liquid solutions binds to the stabilizing polymer.

25. The method of claim 1, wherein said transferring the replicate array comprises providing a replicate array that is a mirror image array of the master array.

26. The method of claim 1, wherein said stabilizing comprises providing a viscosity enhancing polymer to at least one of the liquid solutions.

27. The method of claim 1, wherein the one or more inorganic materials are other than a metal nitrate.

28. The method of claim 26, wherein the viscosity enhancing polymer enhances viscosity of the one or more liquid solutions at least 10 centipoise (cP).

29. The method of claim 1, wherein the liquid solutions comprise two or more inorganic materials.

* * * * *